(12) United States Patent
Downey (10) Patent No.: US 11,811,101 B1
(45) Date of Patent: Nov. 7, 2023

(54) BATTERY BOX

(71) Applicant: Brunswick Corporation, Mettawa, IL (US)

(72) Inventor: Kevin T. Downey, Rockford, MI (US)

(73) Assignee: Brunswick Corporation, Mettawa, IL (US)

( * ) Notice: Subject to any disclaimer, the term of this patent is extended or adjusted under 35 U.S.C. 154(b) by 175 days.

(21) Appl. No.: 17/197,619

(22) Filed: Mar. 10, 2021

(51) Int. Cl.
*H01M 50/00* (2021.01)
*H01M 50/593* (2021.01)

(52) U.S. Cl.
CPC ................................ *H01M 50/593* (2021.01)

(58) Field of Classification Search
CPC .. H01M 50/20; H01M 50/264; H01M 50/271; H01M 50/528
See application file for complete search history.

(56) References Cited

U.S. PATENT DOCUMENTS

| 1,514,670 | A | 11/1924 | Melchior |
| 7,726,427 | B2 | 6/2010 | Picavet |
| 2009/0239137 | A1 | 9/2009 | Kakuchi et al. |
| 2012/0160585 | A1 | 6/2012 | Mildner |

FOREIGN PATENT DOCUMENTS

CN 212810441 U * 3/2021 ............. Y02E 60/10

OTHER PUBLICATIONS

Li et al., A High Radiating Waterproof Dustproof Battery Box for Automobile, Mar. 26, 2021, See the Abstract. (Year: 2021).*
Noco, "Group 24-31 Snap-Top Battery Box," webpage, available at https://no.co/bm318bks, last accessed Feb. 24, 2021.
Taylor, "48200 Aluminum Battery Box, 11.25×9.5 Inch," webpage, available at https://www.speedwaymotors.com/Taylor-48200-Aluminum-Battery-Box-11-25-x-9-5-Inch, last accessed Feb. 15, 2021.

* cited by examiner

*Primary Examiner* — Cynthia H Kelly
*Assistant Examiner* — Monique M Wills
(74) *Attorney, Agent, or Firm* — Andrus Intellectual Property Law, LLP (57) ABSTRACT

A battery box has front and rear walls and first and second sidewalls defining an interior of the battery box. A first guideway is provided on a surface of the first sidewall that faces the interior. A second guideway is provided on a surface of the second sidewall that faces the interior. The first and second guideways extend in the height direction. A first spacer is configured to move in the height direction along the first guideway, and a second spacer is configured to move in the height direction along the second guideway. The first and second guideways and/or the first and second spacers have an angled surface so that as the first and second spacers are moved downwardly in the height direction along the respective first and second guideways, a gap defined in the length direction between the first and second spacers is narrowed.

19 Claims, 6 Drawing Sheets

BATTERY BOX

FIELD

The present disclosure relates to boxes for holding batteries such as automotive, marine, recreational vehicle, golf cart, motorcycle, riding mower, or other similarly sized batteries.

BACKGROUND

A battery box is used to hold a battery for transport, to protect the battery from rain/water, and/or to hold the battery in place on vehicle/machine that does not have a battery compartment. A given vehicle/machine may use a slightly differently sized or shaped battery, depending on the vehicle/machine's requirements, the operator's preference, cost, or other factors.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example, a battery box is defined in a length direction, a height direction, and a width direction. The battery box comprises a front wall and a rear wall spaced from one another in the width direction. A first sidewall and a second sidewall are spaced from one another in the length direction and connect the front and rear walls to define an interior of the battery box. A first guideway is provided on a surface of the first sidewall that faces the interior of the battery box. The first guideway extends in the height direction. A second guideway is provided on a surface of the second sidewall that faces the interior of the battery box. The second guideway also extends in the height direction. A first spacer is configured to move in the height direction along the first guideway, and a second spacer is configured to move in the height direction along the second guideway. At least one of the first and second guideways and the first and second spacers has an angled surface so that as the first and second spacers are moved downwardly in the height direction along the respective first and second guideways, a gap defined in the length direction between the first and second spacers is narrowed.

According to another example, a battery box is defined in a length direction, a height direction, and a width direction. The battery box comprises a front wall and a rear wall spaced from one another in the width direction. A first sidewall and a second sidewall are spaced from one another in the length direction and connect the front and rear walls to define an interior of the battery box. A first guideway is provided on a surface of the first sidewall that faces the interior of the battery box. The first guideway extends in the height direction. A second guideway is provided on a surface of the second sidewall that faces the interior of the battery box. The second guideway also extends in the height direction. A first spacer is configured to move in the height direction along the first guideway, and a second spacer is configured to move in the height direction along the second guideway. A first interface between the first guideway and the first spacer and a second interface between the second guideway and the second spacer are configured as sliding dovetail joints.

In another example, a spacer is configured to be inserted in a battery box defined in a length direction, a height direction, and a width direction. The spacer comprises a first side comprising a socket, which socket is configured to interface with a mating tail on a guideway extending in the height direction along an interior side surface of the battery box. The spacer has a second side opposite the first side, the second side being configured to face an interior of the battery box when the spacer is installed on the guideway. When the spacer is installed on the guideway, the first side of the spacer is angled with respect to a plane defined in the height and width directions and the second side is oriented substantially parallel to the plane defined in the height and width directions. The spacer has a hollow, generally bow-tie-shaped cross section along a plane extending in the length and width directions. The spacer is configured to flex so as to vary a dimension defined in the length direction between the first side of the spacer and the second side of the spacer.

BRIEF DESCRIPTION OF THE DRAWINGS

Examples of a battery box and a spacer for use therewith are described with reference to the following Figures. The same numbers are used throughout the Figures to reference like features and like components.

DETAILED DESCRIPTION

Figure 1:
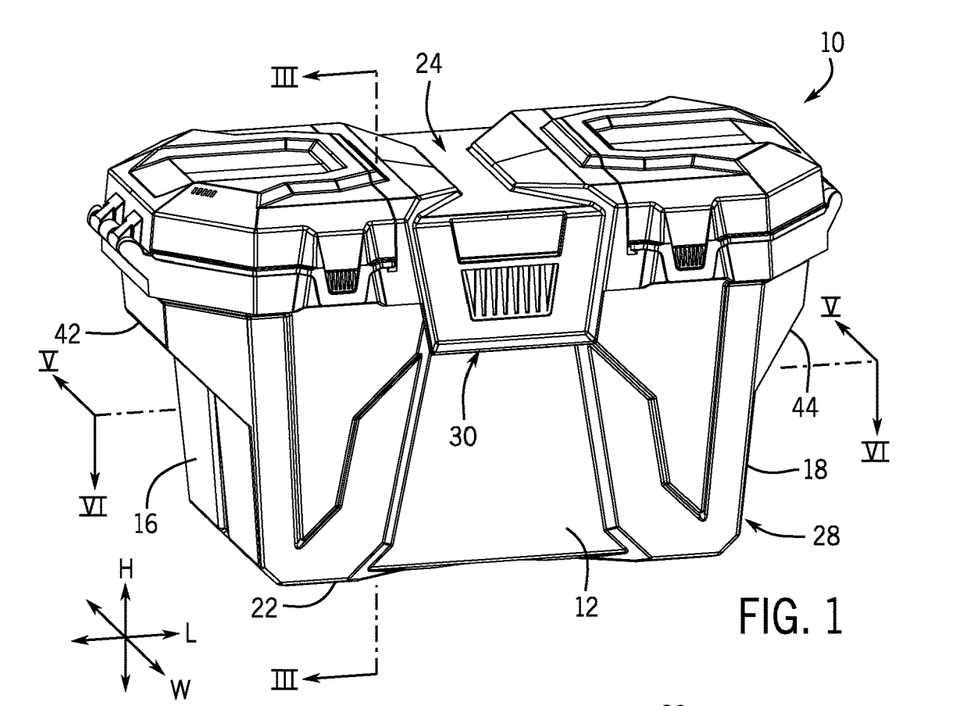
FIG. 1 is a perspective view of a battery box according to the present disclosure.

FIG. 1 illustrates a battery box 10 for holding batteries such as automotive, marine, recreational vehicle, golf cart, motorcycle, riding mower, or other similarly sized batteries. Generally, such batteries are box-shaped themselves, and range from about five inches to about fifteen inches in any of length, width, and height, although this range is not limiting on the scope of the present disclosure. In one particular example, the battery box 10 can be used to hold a marine battery of Group Size 24 or Group Size 27. A given Group Size 24 battery has the dimensions 10.25" L X 6.81" W X 8.87" H. A given Group Size 27 battery has the dimensions 12.05" L X 6.81" W X 8.75" H. (Note that different brands of batteries may have slight variation.) The battery box 10 can be used to hold a battery for transport, to protect the battery from rain/water, and/or to hold the battery in place on a vehicle/machine that does not have a battery compartment.

Figure 2:
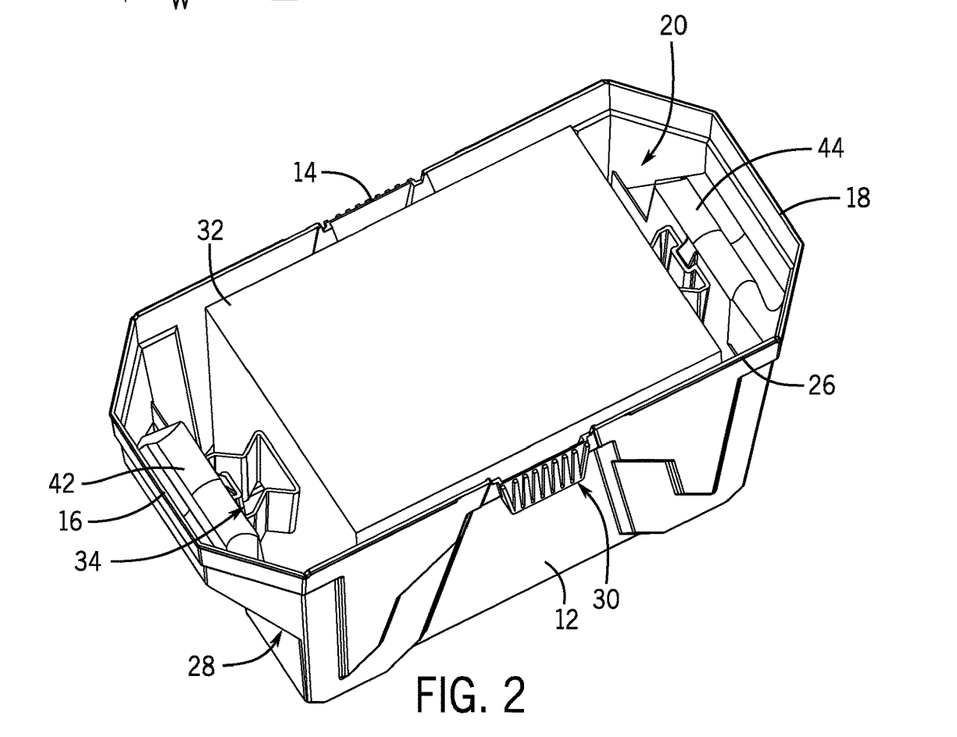
FIG. 2 is a perspective view looking down into the battery box, with a cover portion thereof removed.

The battery box 10 is defined in a length direction L, a height direction H, and a width direction W, each of which direction is perpendicular to the other two directions. Referring also to FIG. 2, a front wall 12 and a rear wall 14 of the battery box 10 are spaced from one another in the width direction W. A first sidewall 16 and a second sidewall 18 are spaced from one another in the length direction L and connect the front and rear walls 12, 14 to define an interior 20 of the battery box 10. The battery box 10 also has a bottom 22 and a cover portion 24, the latter of which can be locked in place over the upper perimeter 26 of a lower portion 28 of the battery box 10 by way of a closure portion 30. Although the lower portion 28 of the battery box 10 is shown here with an upper perimeter 26 having the shape of an elongated octagon, and the shape of the cover portion 24 matches this, in other examples, the upper perimeter 26 and cover portion 24 could have a different shape, such as a rectangle. The battery box 10 can be made of molded plastic or another polymer, aluminum or an alloy thereof, or another suitable material.

FIG. 2 shows the lower portion 28 of the battery box 10 with the cover portion 24 removed, with an exemplary Group Size 24 marine battery 32 placed in the interior 20. However, the dimensions of the lower portion 28 of the battery box 10 could be designed to hold a Group Size 27 marine battery, which, as noted above, is just under two inches longer than the Group Size 24 marine battery. So that a Group Size 24 battery (or smaller) does not shift around in the lower portion 28 of the battery box 10 designed for a larger battery, the battery box 10 is provided with spacers, one of which is shown at 34, that wedge between the inner surfaces of the first and second sidewalls 16, 18 and the battery 32.

Figure 3:
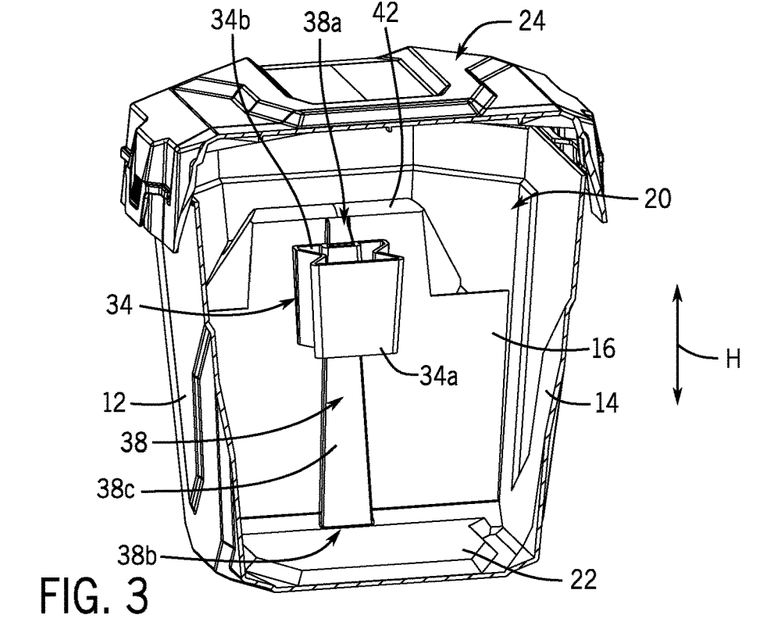
FIG. 3 is a cross-sectional view taken along a plane containing the line III-III in FIG. 1 and looking toward a sidewall of the battery box.
Figure 4:
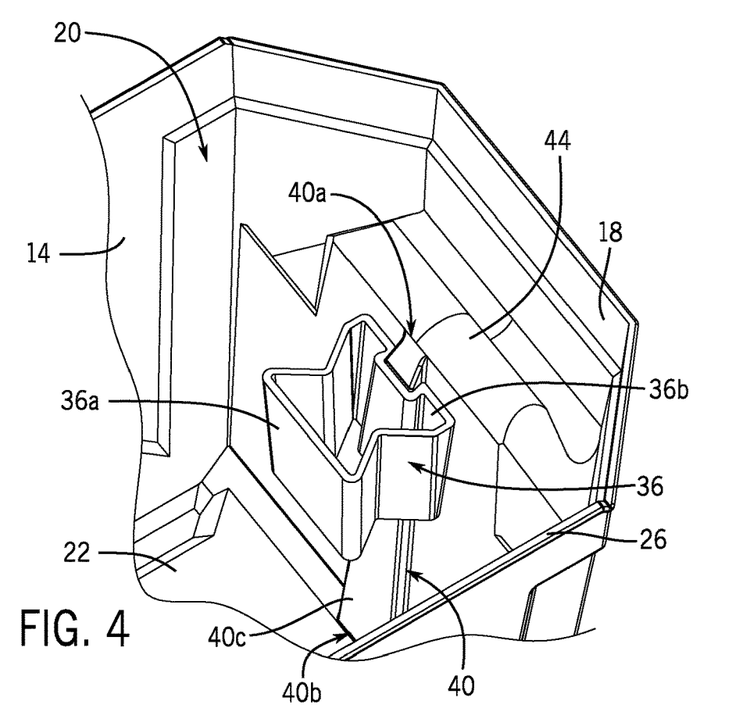
FIG. 4 is a closeup view looking into the bottom portion of the battery box from the top.

FIGS. 3 and 4 show views of the inside surfaces of the first and second sidewalls 16, 18, respectively. As shown in FIG. 3, a first guideway 38 is provided on a surface of the first sidewall 16 that faces the interior 20 of the battery box 10. The first guideway 38 extends in the height direction H from an upper end 38a to a lower end 38b. A first spacer 34 is configured to move in the height direction H along the first guideway 38. As shown in FIG. 4, a second guideway 40 is provided on a surface of the second sidewall 18 that faces the interior 20 of the battery box 10. The second guideway 40 also extends in the height direction H from an upper end 40a to a lower end 40b. A second spacer 36 is configured to move in the height direction H along the second guideway 40. In the present example, the upper ends 38a, 40a of the first and second guideways 38, 40 are provided at the top ends of handles 42, 44 that are molded into the sidewalls 16, 18 of the lower portion 28 of the battery box 10. However, in other examples, the upper ends 38a, 40a of the guideways 38, 40 could be provided closer to or at the upper perimeter 26 of the lower portion 28, for example if the handle(s) for the battery box 10 were located elsewhere. The lower ends 38b, 40b of the guideways 38, 40 are located at the bottom 22 of the battery box 10; however, they could stop above the bottom 22 in other examples.

Figure 5:
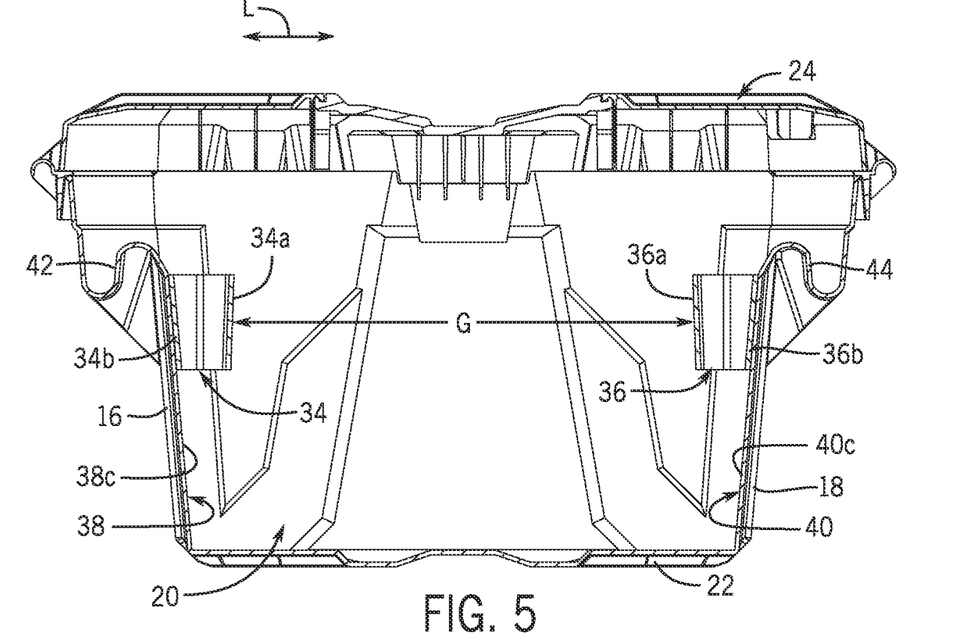
FIG. 5 is a cross-sectional view taken along a plane containing the line V-V of FIG. 1 and looking toward a rear wall of the battery box.
Figure 6:
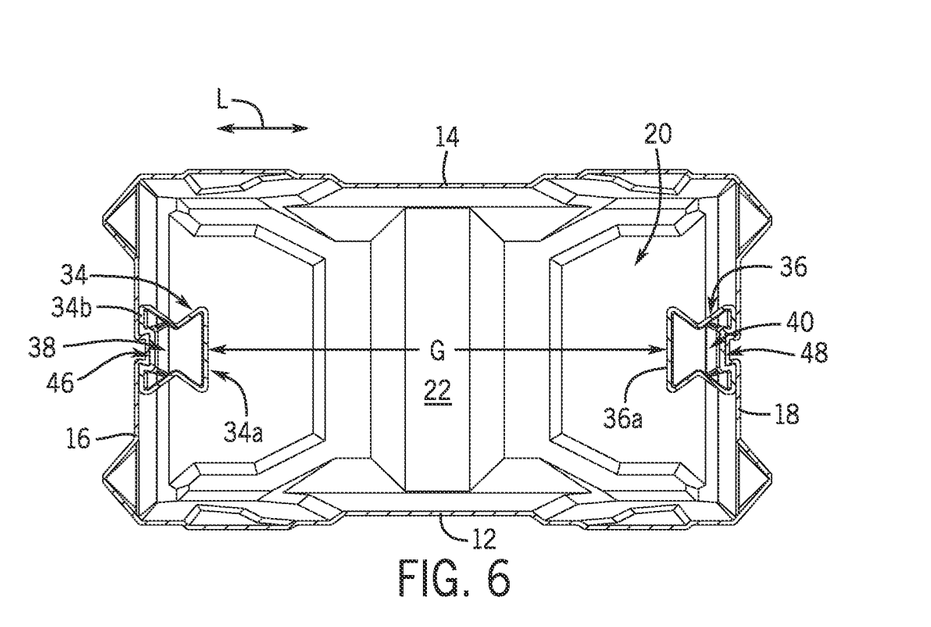
FIG. 6 is a cross-sectional view taken along a plane containing the line VI-VI of FIG. 1 and looking toward a bottom wall of the battery box.

Turning to FIGS. 5 and 6, the battery box 10 is shown in cross section along a plane extending in the height H and length L directions and along a plane extending in the width W and length L directions, respectively. This illustrates a gap G between the two spacers 34, 36 when they are installed on the guideways 38, 40. This gap G defines the length of the space into which the battery 32 can be placed and is more specifically defined between a side 34a of the first spacer 34 that faces the interior 20 of the battery box 10 and a side 36a of the second spacer 36 that faces the interior 20 of the battery box 10. According to the present disclosure, at least one of the first and second guideways 38, 40 and the first and second spacers 34, 36 has an angled surface so that as the first and second spacers 34, 36 are moved downwardly in the height direction H along the respective first and second guideways 38, 40, the G gap defined in the length direction L between the first and second spacers 34, 36 is narrowed.

Figure 18:
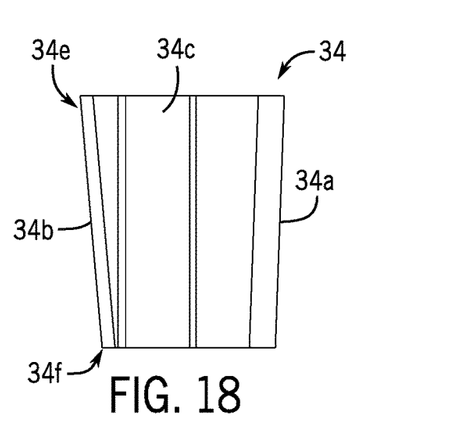
FIG. 18 is a left side elevation view of the spacer.
Figure 19:
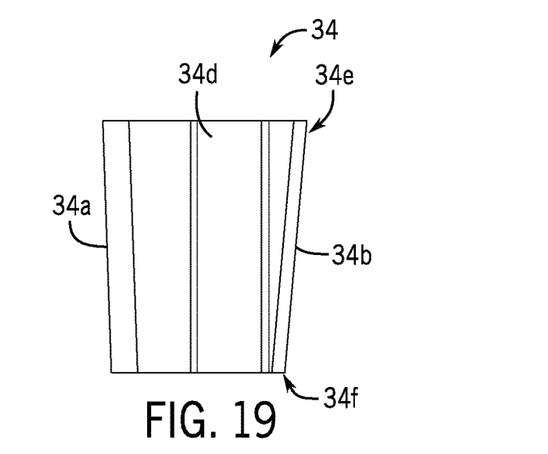
FIG. 19 is a right side elevation view of the spacer.

Referring specifically to FIGS. 3 and 5, both the first guideway 38 and the first spacer 34 have an angled surface. The guideway 38 has an angled surface 38c on the side of the guideway 38 that faces the interior 20 of the battery box 10, which angled surface 38c slopes inwardly toward the interior 20 of the battery box 10 from an upper end 38a to a lower end 38b of the angled surface 38c. As best shown in FIG. 5, the angled surface of the first spacer 34 is on a side 34b of the first spacer 34 that faces the angled surface 38c of the first guideway 38. The angled surface on side 34b of the first spacer 34 also slopes inwardly toward the interior 20 of the battery box 10 from an upper end 34e to a lower end 34f of the angled surface (see FIGS. 18 and 19, showing side views of the spacer 34). Because both the first guideway 38 and the first spacer 34 have an angled surface, and because both the angled surfaces (38c of guideway 38 and on side 34b of spacer 34) slope inwardly toward the interior 20 of the battery box 10, the side 34a of the first spacer 34 that faces the interior 20 of the battery box 10 may be (and here, is) oriented substantially parallel (e.g., ±3 degrees) to a plane defined in the height H and width W directions. This allows the entire surface of side 34a of spacer 34 to contact the battery 32 to be placed in the battery box 10. Of course, this requires that the angle on the angled surfaces (38c of guideway 38 and on side 34b of spacer 34) is the same for both surfaces, and that the side 34a of the spacer 34 is not otherwise angled itself. In one example, the angle of the angled surfaces (38c of guideway 38 and on side 34b of spacer 34) is between three degrees and eight degrees with respect to vertical (i.e., the height direction H). In a particular example, the angle of the angled surfaces is five degrees with respect to the height direction H.

Referring now also to FIG. 4, the first and second guideways 38, 40 and the first and second spacers 34, 36 all have an angled surface that slopes inwardly toward the interior 20 of the battery box 10. The angled surface 40c is on the side of the guideway 40 that faces the interior 20 of the battery box 10, which angled surface 40c slopes inwardly toward the interior 20 of the battery box 10 from an upper end 40a to a lower end 40b of the angled surface 40c. The angled surface of the second spacer is on a side 36b of the second spacer 36 that faces the angled surface 40c of the second guideway 40, and the opposite side 36a of the second spacer 36 that faces the interior 20 of the battery box 10 is oriented substantially parallel (e.g., ±3 degrees) to the plane defined in the height H and width W directions. The angle of the angled surfaces 40c of guideway 40 and on side 36b of spacer 36 may be the same as that of the angled surfaces 38c of guideway 38 and on side 34b of spacer 34, so that the spacers 34, 36 can be used on either guideway 38, 40.

Because both the first and second guideways 38, 40 and the first and second spacers 34, 36 have angled surfaces that slope inwardly toward the interior 20 of the battery box 10, it is clear that positioning the spacers 34, 36 higher up in the height direction H on the guideways 38, 40 will result in a greater gap G in the length direction L than if the spacers 34, 36 were positioned lower down in the height direction H on the guideways 38, 40. For example, if a larger battery 32 is placed in the battery box 10, the spacers 34, 36 can be pushed down the guideways 38, 40 on both sides of the larger battery 32 until the larger battery 32 is wedged in the gap G between the spacers 34, 36; while if a smaller battery 32 is placed in the battery box 10, the spacers 34, 36 can be pushed down the guideways 38, 40 on both sides of the smaller battery 32 further than they were pushed down for the larger battery 32, until the smaller battery 32 is wedged in the smaller gap G between the spacers 34, 36. Thus, the spacers 34, 36 can be positioned at a multitude of different heights along the guideways 38, 40 to accommodate different sized batteries within the gap G between the spacers 34, 36.

Figure 7:
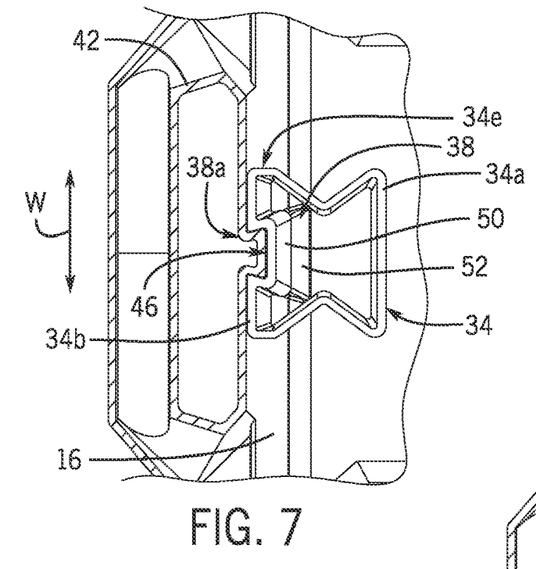
FIG. 7 is a cross-sectional view looking down on one sidewall of the box, taken just above a spacer installed therein.
Figure 8:
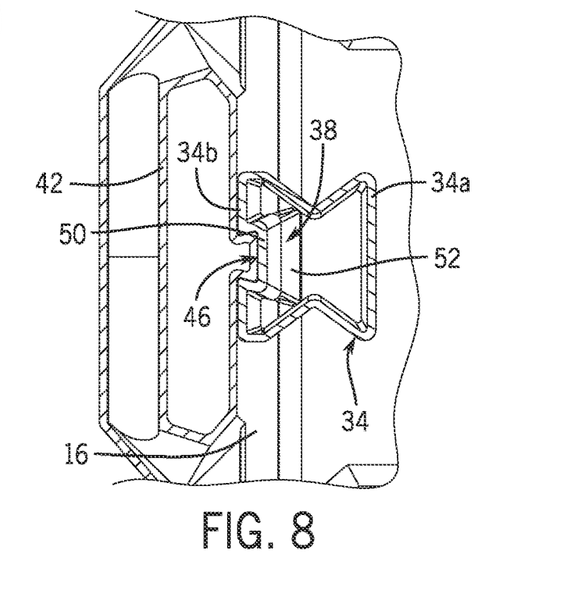
FIG. 8 is a cross-sectional view looking down on the box, taken about midway through the spacer.
Figure 9:
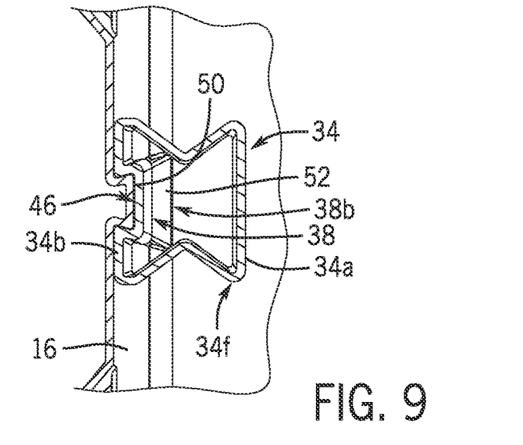
FIG. 9 is a cross-sectional view looking down on the box, taken almost at the lower end of the spacer.
Figure 10:
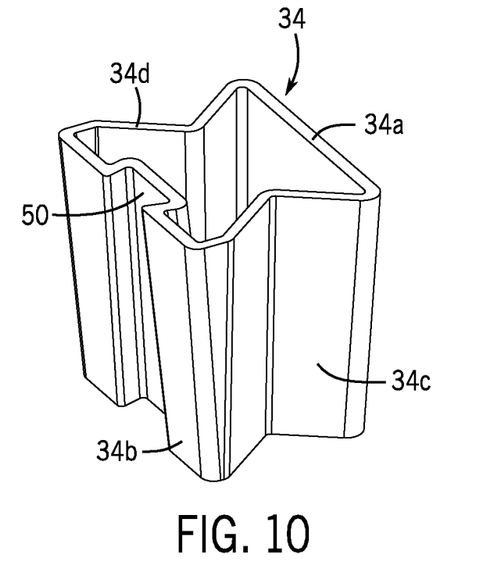
FIGS. 10-13 are various perspective views of the spacer in isolation.
Figure 11:
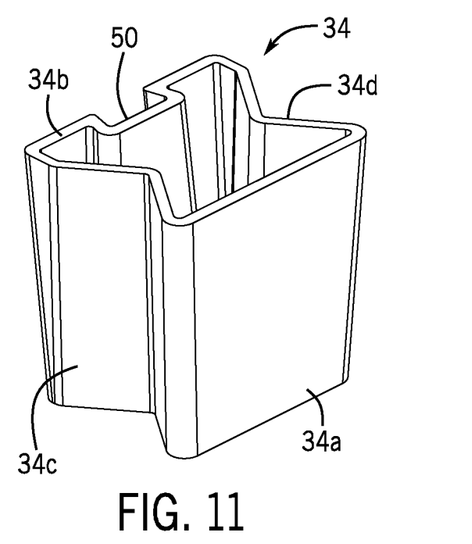
Figure 12:
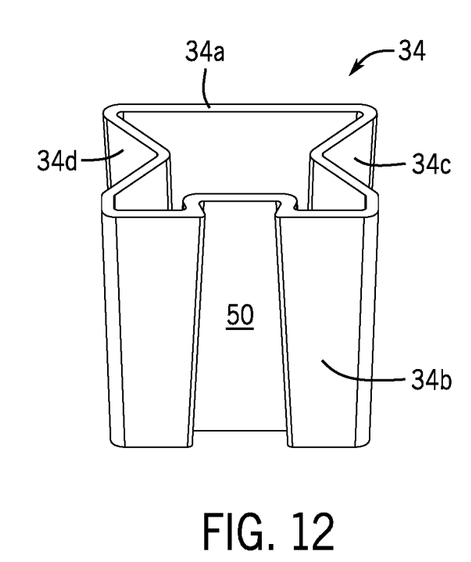
Figure 13:
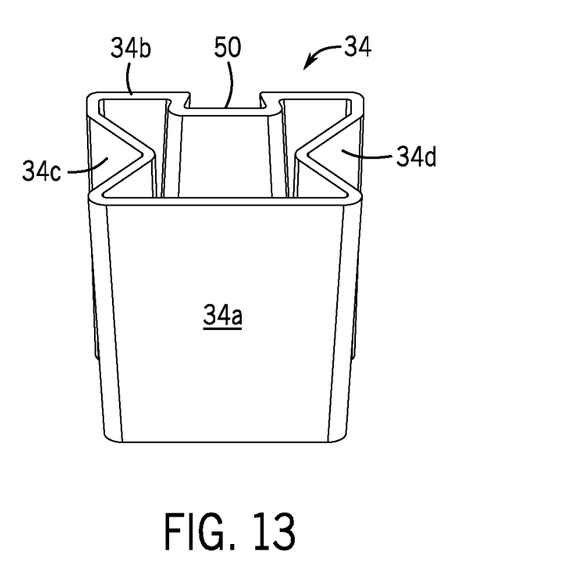

Referring to FIG. 6, the spacers 34, 36 and guideways 38, 40 are shaped to provide for a sliding, yet stable, fit at the interfaces therebetween. In the present example, a first interface 46 between the first guideway 38 and the first spacer 34 and a second interface 48 between the second guideway 40 and the second spacer 36 are configured as sliding dovetail joints. Because the spacers 34, 36 and guideways 38, 40 are mirror images of one another, only the interface 46 between the first guideway 38 and first spacer 34 will be described in more detail, it being understood that the same description applies to the interface 48 between the second guideway 40 and the second spacer 36. Referring to FIGS. 7-9, as noted above, the interface 46 between the first guideway 38 and the first spacer 34 is configured as a sliding dovetail joint. The side 34b of the first spacer 34 that faces the first guideway 38 comprises one of a tail and a socket configured to interface with one of a mating socket and a mating tail formed on the first guideway 38. Here, the side 34b of the spacer 34 that faces the guideway 38 comprises the socket 50 of the respective sliding dovetail joint (see also FIGS. 10-13), and the guideway 38 comprises the tail 52 of the respective sliding dovetail joint (see also FIG. 3). However, in another example, the tail could be provided on the spacer 34 and the socket on the guideway 38.

Figure 17:
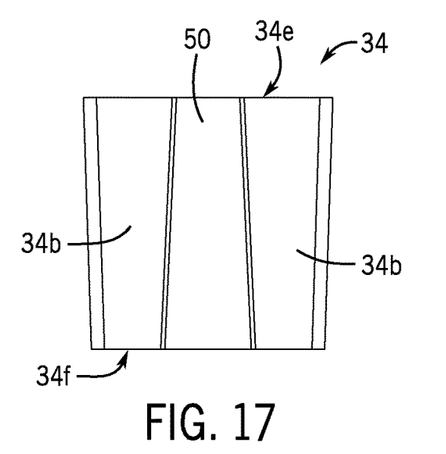
FIG. 17 is a rear elevation view of the spacer.

As shown in the progression of drawings in FIGS. 7-9, at least one of the tail 52 and the socket 50 of the sliding dovetail joint widens in the width direction W from an upper end to a lower end of the sliding dovetail joint. FIG. 7 shows a cross section taken along a plane in the length L and width W directions, just above the spacer 34, at the upper end 38a of the guideway 38 (i.e., the upper end of the sliding dovetail joint). FIG. 8 shows a cross section taken along another plane in the length L and width W directions, cutting about midway through the spacer 34. FIG. 9 shows a cross section taken along yet another plane in the length L and width W directions, this time just above the bottom end of the spacer 34. By comparison of FIGS. 7-9, it is apparent that the socket 50 formed on the side 34b of the spacer 34 widens from the upper end 34e of the spacer 34 to the lower end 34f of the spacer (see also FIG. 17). It can also be seen that the guideway 38 widens from its upper end 38a to its lower end 38b (see also FIG. 3). This means that the wider lower end 34f of the spacer 34 can easily fit over the narrower upper end 38a of the guideway 38. As the spacer 34 is slid downward on the guideway 38 in the height direction H, eventually, the surfaces of the socket 50 will align with and contact the surfaces of the guideway 38, as shown in FIGS. 7-9, and the spacer 34 will not be able to travel further downwardly. This increases the stability of the interface between the spacer 34 and the guideway 38 and increases the wedging force of the spacer 34 against the side of the battery 32 placed in the interior 20 of the battery box 10.

Figure 14:
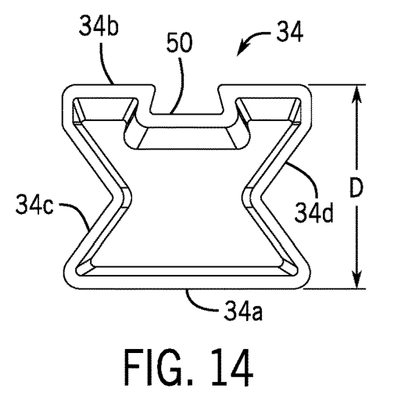
FIG. 14 is a top plan view of the spacer.
Figure 15:
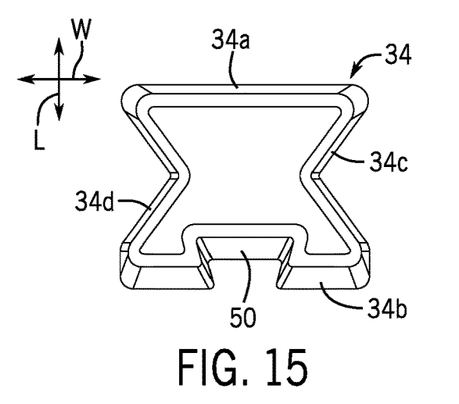
FIG. 15 is a bottom plan view of the spacer.
Figure 16:
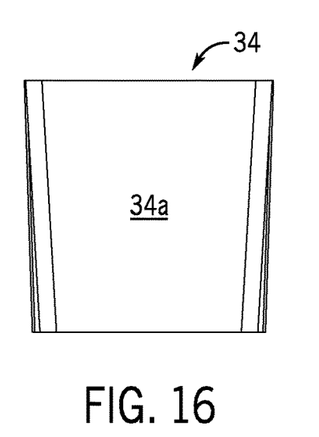
FIG. 16 is a front elevation view of the spacer.

FIGS. 10-19 show additional views of the spacer 34 in isolation, it being noted that the spacer 36 is identical to the spacer 34. The spacer 34 has a first side 34b comprising the socket 50 configured to interface with the mating tail 52 on the guideway 38, which as described above, extends in the height direction H along an interior side surface of the battery box 10. The spacer 34 also has a second side 34a opposite the first side 34b, the second side 34a being configured to face an interior 20 of the battery box 10 when the spacer 34 is installed on the guideway 38. As best shown in FIGS. 14 and 15, the spacer 34 has a hollow, generally bow-tie-shaped cross section along a plane extending in the length L and width W directions. The spacer 34 is configured to flex so as to vary a dimension D (FIG. 14) defined in the length direction L between the first side 34b of the spacer 34 and the second side 34a of the spacer 34. This flexure is provided for in part by the bow-tie-shaped cross section of the spacer 34, wherein the V-notched sides 34c, 34d connecting the sides 34a, 34b act as living hinges, as well as the relatively flexible material of which the spacer 34 is made. For instance, the spacer 34 can be made of a flexible polymer or plastic such as polypropylene, or of a metal such as aluminum that when thin enough is able to flex. In other examples, the cross-sectional shape of the spacer 34 is that of the letter "Z" or the letter "X." The spacer's ability to flex further allows the spacer 34 to be wedged down along the guideway 38 between the sidewall 16 of the battery box 10 and the battery 32 placed in the interior 20 thereof.

Referring back to FIGS. 5-9, note that when the spacer 34 is installed on the guideway 38, the first side 34b of the spacer 34 is angled with respect to a plane defined in the height H and width W directions and the second side 34a is oriented substantially parallel to the plane defined in the height H and width W directions. Because the side 34a of the spacer 34 that faces the interior 20 of the battery box 10 is oriented substantially parallel (±3 degrees to account for manufacturing tolerances) to the plane defined in the height H and width W directions, the entire surface of the side 34a is able to contact the battery 32 placed in the battery box 10 to increase the surface area of the wedging force thereupon and thus the stability of the battery 32 within the battery box 10. As noted herein above, this substantially parallel face on side 34a is accomplished by angling the opposite side 34b at the same angle as the guideway 38.

Although the present inventor has found that angled guideways 38, 40 and angled spacers 34, 36, in combination with the spacers 34, 36 being flexible in the length direction L by virtue of their cross-sectional shape and the material of which they are made is particularly advantageous for wedging a battery 32 into the interior 20 of the battery box 10, other combinations are possible. For example, only the spacers 34, 36 could be angled (e.g., wedge-shaped) while the sidewalls 16, 18 and guideways 38, 40 are parallel to one another and perpendicular to the bottom 22. Conversely, only the sidewalls 16, 18 and guideways 38, 40 can be angled, while the spacers 34, 36 are rectangular. Although the guideways 38, 40 are shown herein as being parallel to the sidewalls 16, 18, respectively, in other examples, the sidewalls 16, 18 can be perpendicular to the bottom 22, and the guideways 38, 40 alone can be wedge-shaped and angle inwardly toward the interior 20 from top to bottom. Furthermore, although the interfaces 46, 48 between the spacers 34, 36 and guideways 387, 40 are shown as sliding dovetail joints, in other examples, the "tail" of the joints could be circular, ovular, T-shaped, or L-shaped in cross-section, with the "socket" shaped to match. In still other examples, the joints do not have any ability to withstand force in the length direction L, but are just simple rectangular tracks.

It should be understood that the battery box 10 can be used without the spacers 34, 36, in which case it may be able to accommodate a larger battery than if the spacers 34, 36 are used. The battery box 10 could be provided with differently sized spacers (e.g., those having greater or lesser dimensions D, see FIG. 14) to accommodate batteries of a range of sizes smaller than that the battery box 10 itself could otherwise accommodate. In some examples, the sides of the front and rear walls 12, 14 of the battery box 10 that face the interior 20 thereof are provided with guideways and spacers similar to those described as being located on the sidewalls 16, 18 of the battery box 10. This would allow the battery box 10 to house even smaller batteries, having a width dimension that is less than the width dimension of the interior 20 of the battery box 10.

The present embodiment is shown with one spacer 34, 36 on each side of the battery 32, which is advantageous in that it allows the battery 32 to be centered in the battery box 10, thereby maintaining the terminals near the cable outlets (not shown) on the battery box 10 and balancing the weight in the battery box 10, which is helpful while it is being transported. However, it is envisioned that one spacer 34 or 36 could be used on one side of the battery 32, depending on the size of the battery 32 with respect to the interior 20 of the battery box 10.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A battery box being defined in a length direction, a height direction, and a width direction, the battery box comprising:
    a front wall and a rear wall spaced from one another in the width direction;
    a first sidewall and a second sidewall spaced from one another in the length direction and connecting the front and rear walls to define an interior of the battery box;
    a first guideway on a surface of the first sidewall that faces the interior of the battery box, the first guideway extending in the height direction;
    a second guideway on a surface of the second sidewall that faces the interior of the battery box, the second guideway extending in the height direction;
    a first spacer configured to move in the height direction along the first guideway; and
    a second spacer configured to move in the height direction along the second guideway;
    wherein at least one of the first and second guideways and the first and second spacers has an angled surface so that as the first and second spacers are moved downwardly in the height direction along the respective first and second guideways, a gap defined in the length direction between the first and second spacers is narrowed.

2. The battery box of claim 1, wherein both the first guideway and the first spacer have the angled surface, and wherein the angled surfaces slope inwardly toward the interior of the battery box.

3. The battery box of claim 2, wherein the angled surface of the first spacer is on a side of the first spacer that faces the angled surface of the first guideway, and wherein an opposite side of the first spacer that faces the interior of the battery box is oriented substantially parallel to a plane defined in the height and width directions.

4. The battery box of claim 1, wherein an interface between the first guideway and the first spacer is configured as a sliding dovetail joint.

5. The battery box of claim 4, wherein at least one of a tail and a socket of the sliding dovetail joint widens in the width direction from an upper end to a lower end of the sliding dovetail joint.

6. The battery box of claim 1, wherein the first spacer has a hollow, generally bow-tie-shaped cross section along a plane extending in the length and width directions.

7. The battery box of claim 6, wherein the first spacer is configured to flex so as to vary a dimension defined in the length direction between a side of the first spacer that faces the interior of the battery box and an opposite side thereof that faces the first guideway.

8. The battery box of claim 7, wherein the side of the first spacer that faces the interior of the battery box is oriented substantially parallel to a plane defined in the height and width directions.

9. The battery box of claim 7, wherein the side of the first spacer that faces the first guideway comprises one of a tail and a socket configured to interface with one of a mating socket and a mating tail formed on the first guideway.

10. The battery box of claim 1, wherein the angled surface slopes inwardly toward the interior of the battery box from an upper end to a lower end of the angled surface.

11. The battery box of claim 10, wherein the first and second guideways and the first and second spacers all have the angled surface that slopes inwardly toward the interior of the battery box;
    wherein the angled surface of the first spacer is on a side of the first spacer that faces the angled surface of the first guideway, and wherein an opposite side of the first spacer that faces the interior of the battery box is oriented substantially parallel to a plane defined in the height and width directions; and
    wherein the angled surface of the second spacer is on a side of the second spacer that faces the angled surface of the second guideway, and wherein an opposite side of the second spacer that faces the interior of the battery box is oriented substantially parallel to the plane defined in the height and width directions.

12. A battery box being defined in a length direction, a height direction, and a width direction, the battery box comprising:
    a front wall and a rear wall spaced from one another in the width direction;
    a first sidewall and a second sidewall spaced from one another in the length direction and connecting the front and rear walls to define an interior of the battery box;
    a first guideway on a surface of the first sidewall that faces the interior of the battery box, the first guideway extending in the height direction;

a second guideway on a surface of the second sidewall that faces the interior of the battery box, the second guideway extending in the height direction;

a first spacer configured to move in the height direction along the first guideway; and a second spacer configured to move in the height direction along the second guideway;

wherein a first interface between the first guideway and the first spacer and a second interface between the second guideway and the second spacer are configured as sliding dovetail joints.

13. The battery box of claim 12, wherein at least one of a tail and a socket of each sliding dovetail joint widens in the width direction from an upper end to a lower end of the sliding dovetail joint.

14. The battery box of claim 13, wherein each of the first and second spacers has a hollow, generally bow-tie-shaped cross section along a plane extending in the length and width directions.

15. The battery box of claim 14, wherein each of the first and second spacers is configured to flex so as to vary a dimension defined in the length direction between a side of the spacer that faces the interior of the battery box and an opposite side of the spacer that faces the respective first or second guideway.

16. The battery box of claim 15, wherein the side of the spacer that faces the interior of the battery box is oriented substantially parallel to a plane defined in the height and width directions.

17. The battery box of claim 15, wherein the side of the spacer that faces the respective first or second guideway comprises the socket of the respective sliding dovetail joint, and the first or second guideway comprises the tail of the respective sliding dovetail joint.

18. The battery box of claim 12, wherein at least one of the first and second guideways and the first and second spacers has an angled surface so that as the first and second spacers are moved downwardly in the height direction along the respective first and second guideways, a gap defined in the length direction between the first and second spacers is narrowed.

19. The battery box of claim 18, wherein the angled surface slopes inwardly toward the interior of the battery box from an upper end to a lower end of the angled surface.

\* \* \* \* \*